US006889106B2

(12) United States Patent
Wei

(10) Patent No.: US 6,889,106 B2
(45) Date of Patent: May 3, 2005

(54) MASTER PRODUCTION SCHEDULING MANAGEMENT SYSTEM AND METHOD

(75) Inventor: Hung-Shan Wei, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 22 days.

(21) Appl. No.: 10/662,032

(22) Filed: Sep. 12, 2003

(65) Prior Publication Data

US 2004/0117048 A1 Jun. 17, 2004

(30) Foreign Application Priority Data

Dec. 13, 2002 (TW) .......................................... 91136042

(51) Int. Cl.[7] .......................... G06F 17/00; G06F 19/00
(52) U.S. Cl. .............................. 700/100; 700/90; 705/8
(58) Field of Search .............................. 700/90, 95, 97, 700/103, 107, 169; 705/1, 8

(56) References Cited

U.S. PATENT DOCUMENTS 4,661,912 A * 4/1987 Imanishi ..................... 700/169
4,852,001 A * 7/1989 Tsushima et al. .............. 705/8
5,197,001 A 3/1993 Mukherjee
5,237,508 A * 8/1993 Furukawa et al. .......... 700/100
5,983,195 A * 11/1999 Fierro ......................... 705/10
6,243,612 B1 * 6/2001 Rippenhagen et al. ...... 700/100
6,345,259 B1 * 2/2002 Sandoval ....................... 705/7
2002/0123815 A1 8/2003 Bickley et al.
2004/0049398 A1 * 3/2004 Gartland et al. ............... 705/1

FOREIGN PATENT DOCUMENTS

CN 1277401 A 6/1999

* cited by examiner

*Primary Examiner*—Jayprakash N. Gandhi
(74) *Attorney, Agent, or Firm*—Wei Te Chung

(57) ABSTRACT

A master production scheduling management system and method for efficiently generating master production schedules (MPSs) is provided. The system includes a plurality of client computers (3), an MPS management server (1), a database server (4) and a communication network (2) interconnecting the client computers, the database server, and the MPS management server. The MPS management server obtains data from external information systems by use of a data retrieving module (100), generates an original MPS based on the obtained data, and amends the original MPS to be an optimized MPS by simulating rough-cut capacity planning (RCCP) and material requirements planning (MRP). Employing the present invention, users can amend MPSs in time by simulating RCCPs and MRPs and arrange production schedules efficiently.

4 Claims, 6 Drawing Sheets

MASTER PRODUCTION SCHEDULING MANAGEMENT SYSTEM AND METHOD

BACKGROUND OF THE INVENTION

1. Field of the Invention

The present invention relates to material requirement planning systems and methods, and particularly to a master production scheduling management system and method.

2. Background of the Invention

Master production schedules (MPSs) are vital for all manufacturers, especially large-scale manufacturing enterprises. An MPS is a production schedule for finished products spanning a period of time in the future. The aim of the MPS is to timely forward the finished products to relevant customers, while avoiding overloading or underutilization of production apparatus and production capacity. Usually, a manufacturer makes purchase orders for necessary raw materials and components according to production demand, buffer inventory and lead time, and transmits the purchase orders to corresponding vendors. The vendors provide the raw materials and components to the manufacturer according to the purchase orders. Changes in market supply and demand cause much uncertainty in production demand, and purchase orders frequently need to be changed or re-scheduled. If the purchase orders are not re-scheduled methodically and timely, this can lead to delays in supply of the raw materials and components, and consequent delays in production.

China Patent No. CN1277401A, published on Dec. 20, 2000, discloses a purchase order producing system. The system is executed on a computer that comprises a storage and a processor. The system comprises: a demand database for recording demand for material in each week of a predetermined period; a buffer inventory module for calculating an average demand in each week, and for calculating a buffer inventory that should be maintained at the end of each week based on the average demand; and a purchase order module for generating purchase orders for each week based on the average demand of the week, on-hand inventory and the buffer inventory.

The above-mentioned purchase order producing system can meet demand for material only to a limited extent; that is, according to weekly cycles. The system cannot generate purchase orders according to more up-to-date production demand and material demand. Nowadays, production demand can fluctuate even daily, so that a manufacturer can quickly respond to a customer's new requirements. If material demand cannot be changed quickly to support a new production demand, the manufacturer runs the risk of late or inefficient production, having an unsatisfied customer, or even losing a customer.

Thus, a system and method is needed for managing master production scheduling, by use of which a manufacturer can simulate production capacity and material demand to make suitable MPSs, and reschedule the MPSs as needed to respond to customers' new requirements.

SUMMARY OF THE INVENTION

Accordingly, an object of the present invention is to provide a master production scheduling management system for generating master production schedules (MPSs) by simulating rough-cut capacity planning (RCCP) and material requirements planning (MRP), and for rescheduling the MPSs as needed.

Another object of the present invention is to provide a master production scheduling management method for generating master production schedules (MPSs) by simulating RCCP and MRP, and for rescheduling the MPSs as needed.

In order to accomplish the first above-mentioned object, the present invention provides a master production scheduling management system for generating master production schedules. The master production scheduling management system comprises a plurality of client computers, a database server, an MPS management server, and a network interconnecting the client computers, the database server and the MPS management server. The MPS management server comprises a data retrieving module for obtaining data from external information systems such as a purchase order information system, an MPS generating module for generating an original MPS, and for amending the original MPS to be an optimized MPS by simulating rough-cut capacity planning (RCCP) and material requirements planning (MRP), a simulating module for simulating the RCCP and the MRP based on the original MPS, a weekly scheduling module for generating weekly production schedules based on the optimized MPS, and a data maintaining module for performing maintenance of basic data, the basic data comprising sales forecast data, an enterprise's calendar, and parameters of material codes in an MPS.

In order to accomplish the second above-mentioned object, a preferred method for generating master production schedules comprises the following steps: (i) retrieving relevant data from external information systems, the retrieved data comprising up-to-date data on purchase orders, data on sales forecasts, inventory data and data on manufacturing orders; (ii) generating an original master production schedule based on the retrieved data; (iii) simulating rough-cut capacity planning (RCCP) and material requirements planning (MRP); (iv) determining whether there are one or more contingencies that require rescheduling of the original MPS according to simulation results; (v) amending the original MPS if there are any said contingencies; and (vi) generating an optimized MPS.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Figure 1:
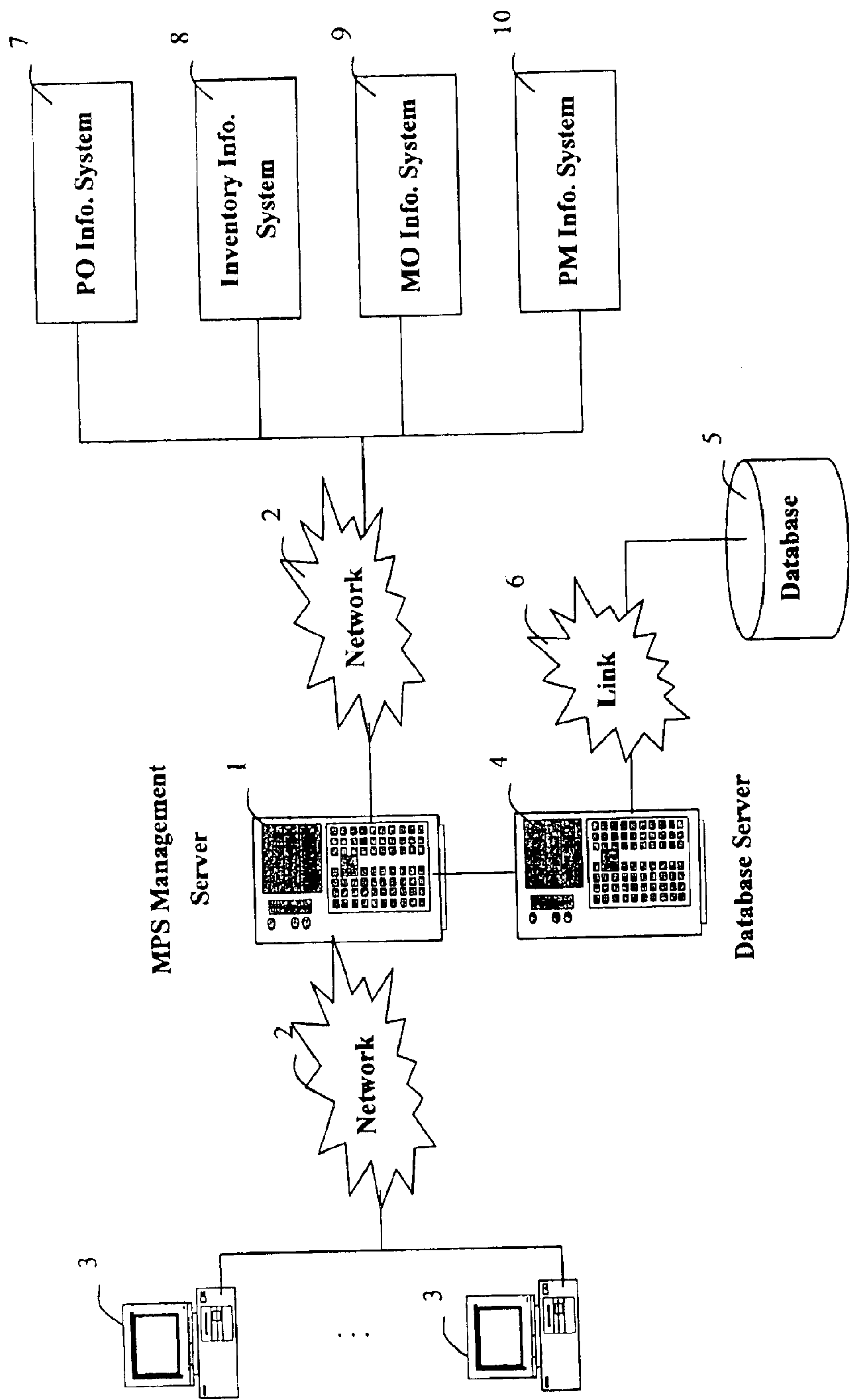
FIG. 1 is a schematic diagram of an application environment of a master production scheduling management system in accordance with a preferred embodiment of the present invention, the system comprising an MPS management server.

FIG. 1 is a schematic diagram of an application environment of a master production scheduling management system in accordance with the present invention. The master production scheduling management system employs a three-tier infrastructure: a plurality of client computers 3, a master production schedule (MPS) management server 1, and a database server 4, all of which are linked via a network 2. The MPS management server 1 is linked to a purchase order (PO) information system 7, an inventory information system 8, a manufacturing order (MO) information system 9 and a production management (PM) information system 10 via the network 2. The above-mentioned external information systems 7–10 store corresponding purchase orders, inventory information, manufacturing orders and production information in a database 5 via the network 2 and the MPS management server 1. The network 2 is an electronic communication network such as an intranet, the Internet or another suitable communication network.

The client computers 3 are distributed at different locations of an enterprise, and respectively provide interfaces for various users of the master production scheduling management system. The users comprise relevant production managers. The users can access the MPS management server 1 via the client computers 3 to perform operations such as maintaining data in the database 5.

The MPS management server 1 comprises core and mutable enterprise logic of the master production scheduling management system. Such logic includes rules for execution and management of the master production scheduling management system. The MPS management server 1 processes input by users, and returns results of processing to users.

The database server 4 is connected to the database 5 by a link 6. The link 6 is a kind of database connectivity, such as an open database connectivity (ODBC) or a Java database connectivity (JDBC). The database server 4 controls processing of data stored in the database 5. Such processing includes reading, writing, deleting, modifying, and backup.

Figure 2:
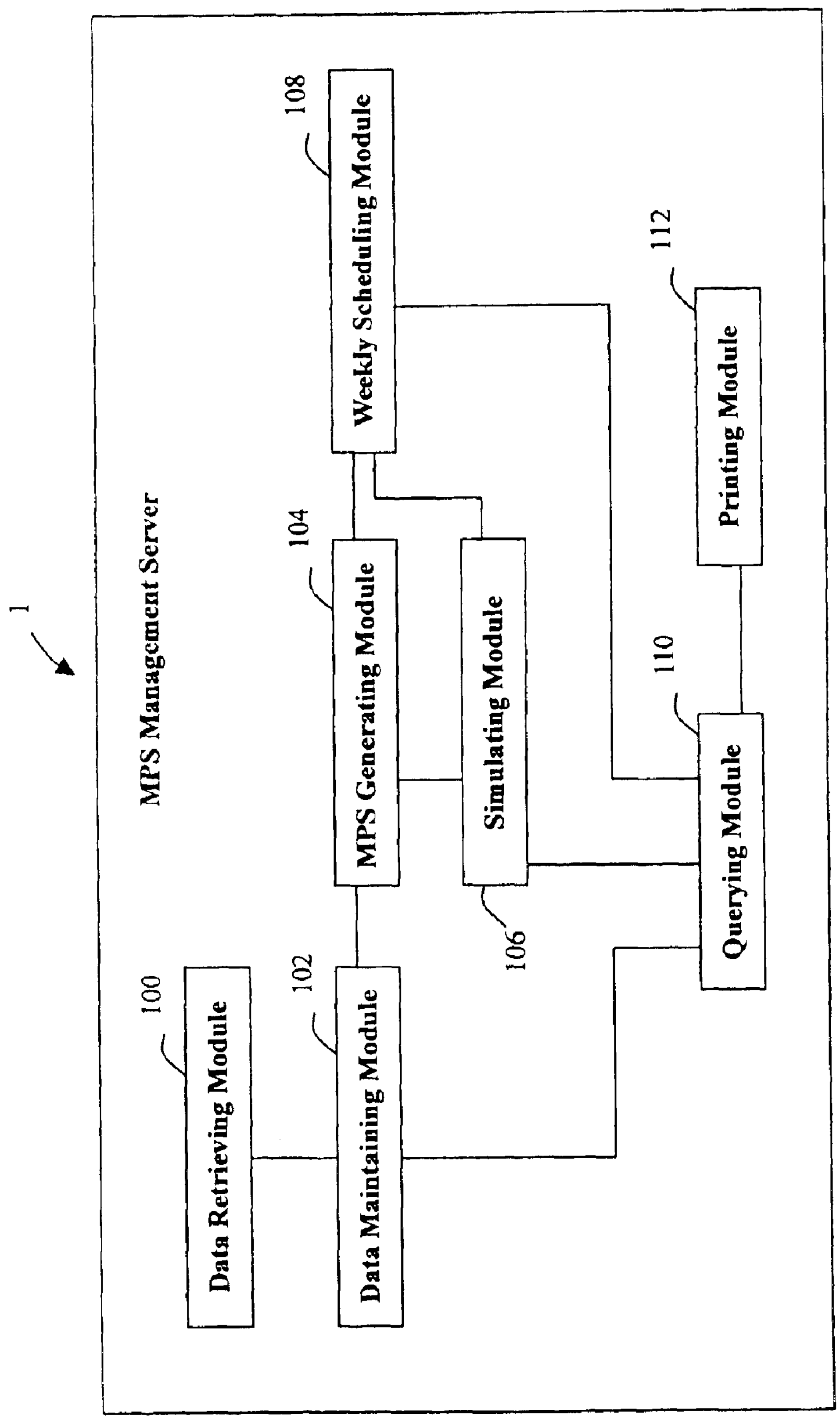
FIG. 2 is a schematic diagram of infrastructure of the MPS management server of FIG. 1.

FIG. 2 is a schematic diagram of infrastructure of the MPS management server 1. The MPS management server 1 comprises a data retrieving module 100, a data maintaining module 102, an MPS generating module 104, a simulating module 106, a weekly scheduling module 108, a querying module 110, and a printing module 112.

The data retrieving module 100 is used for obtaining information from the external information systems 7–10. For example, the data retrieving module 100 can retrieve data on purchase orders from the purchase order information system 7, retrieve data on production materials and inventories thereof from the inventory information system 8, retrieve data on manufacturing orders from the manufacturing order information system 9, and retrieve data on production management from the production management information system 10. The data retrieving module 100 also transmits manufacturing orders generated by the MPS generating module 104 to the manufacturing order information system 9.

The data maintaining module 102 is used for performing maintenance of basic data; the basic data comprising sales forecast data, the enterprise's calendar, and parameters of material codes in an MPS. Such maintenance includes addition, deletion, and modification of the basic data. The parameters of material codes comprise Available to Promise (ATP), Demand Time Fence (DTF), and Planning Time Fence (PTF). The ATP is the "uncommitted" portion of a current inventory and/or future planned supply of the enterprise, which is updated dynamically in real time. The DTF is a point in time between a current date and a PTF. The PTF is a point in time between a DTF and a planning horizon that is scheduled in an MPS.

The MPS generating module 104 is used for generating an original MPS, and for amending the original MPS to be an optimized MPS according to demands for rescheduling.

The simulating module 106 is used for simulating rough-cut capacity planning (RCCP) and material requirements planning (MRP) based on the original MPS. RCCP is a process of converting an MPS into a critical production capacity. The critical production capacity comprises human resources, production apparatuses, and inventory capacity. The simulating module 106 comprises a simulation mode selecting sub-module, an RCCP simulating sub-module, an MRP simulating sub-module, and a simulation report generating sub-module (the above-mentioned sub-modules are not shown in FIG. 2). The simulation mode selecting sub-module is used for selecting various simulation modes for performing simulation. In the preferred embodiment of the present invention, the simulation modes comprise an RCCP simulation mode and an MRP simulation mode. Each of these simulation modes has respective simulation parameters. The RCCP simulating sub-module is used for simulating the original MPS when the RCCP simulation mode is selected. The MRP simulating sub-module is used for simulating the original MPS when the MRP simulation mode is selected. The simulation report generating sub-module is used for generating simulation reports based on simulation results generated by the RCCP simulating sub-module and the MRP simulating sub-module. If the simulation results are generated by the RCCP simulating sub-module, the simulation report can list workstations that have insufficient production capacity. If the simulation results are generated by the MRP simulating sub-module, the simulation report can list production materials in shortage.

The weekly scheduling module 108 is used for making a production schedule of a forthcoming week based on an MPS. The MPS may be an original MPS or an optimized MPS.

The querying module 110 is used for generating queries based on query demands of clients, transmitting the queries to the database server 4, and receiving query results returned by the database server 4. By use of the querying module 110, a client can query MPSs, purchase orders, sales forecasts, enterprise calendars, ATP data and so on. The purchase orders can be queried according to products and vendors.

The printing module 112 is used for printing the query results returned by the database server 4. The printing module 112 also prints data maintained by the data maintaining module 102.

Figure 3:
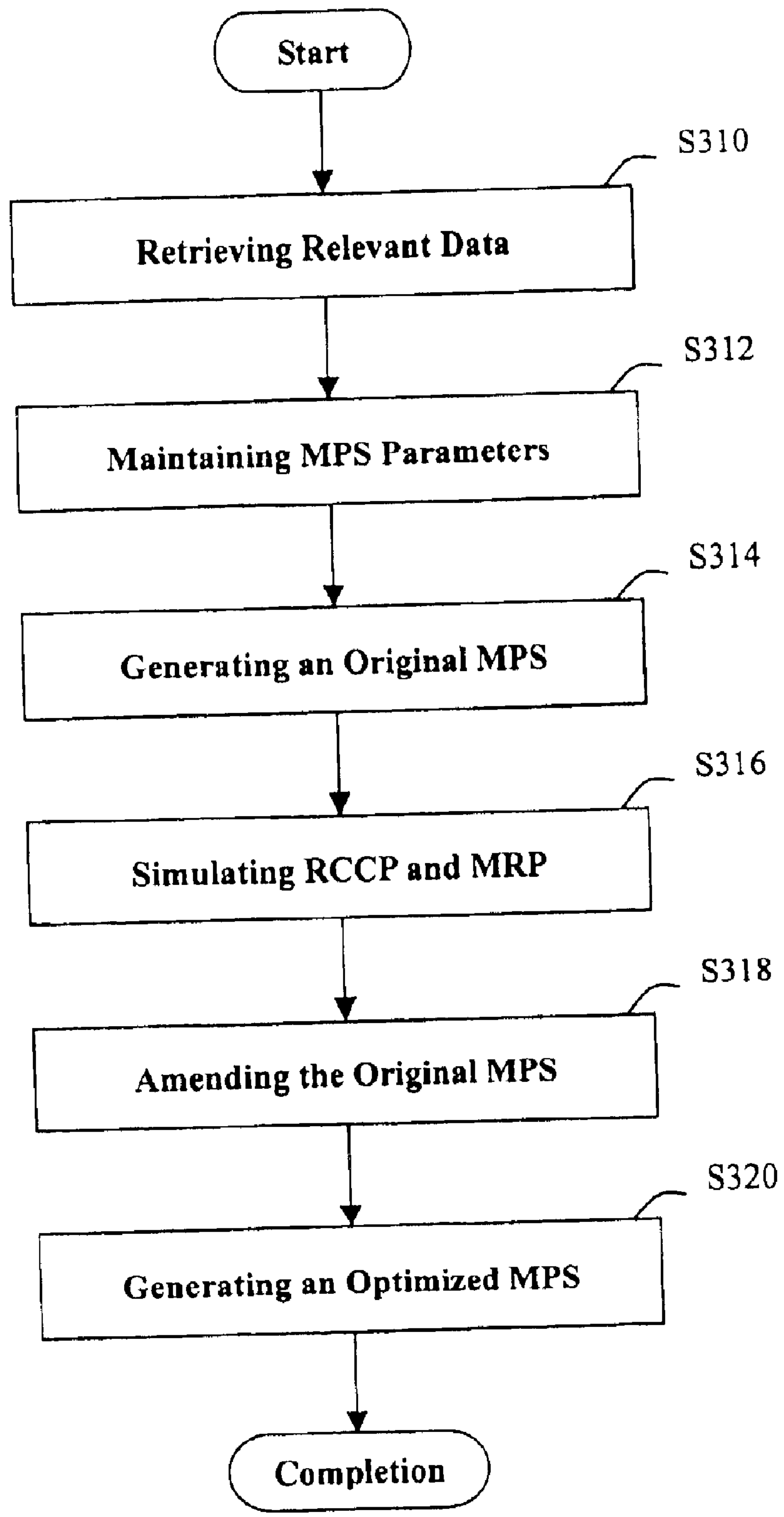
FIG. 3 is a flow chart of a preferred master production scheduling management method in accordance with the present invention.

FIG. 3 is a flow chart of a preferred master production scheduling management method in accordance with the present invention. At step S310, the data retrieving module 100 retrieves up-to-date data on purchase orders and data on sales forecasts from the purchase order information system 7, retrieves inventory data from the inventory information system 8, and retrieves data on manufacturing orders from the manufacturing order information system 9. The data retrieving module 100 can list the data on purchase orders in order of importance thereof. At step S312, the data maintaining module 102 maintains MPS parameters, such as production modes, ATPs, DTFs and so on. The production modes comprise make to stock (MTS), make to order (MTO), and project-based production. Under the MTS mode, products are finished based on sales forecasting before the manufacturing enterprise receives orders. Under the MTO mode, products are finished based on actual orders received by the manufacturing enterprise. Under the project-based production mode, products are finished based on fixed workstations. At step S314, the MPS generating module 104 generates an original MPS pursuant to the MPS parameters. The original MPS comprises demand information, current inventory data, ATP data, and quantities of products finished daily according to the PTF. At step S316, the simulating module 106 simulates RCCP and MRP of the enterprise, and determines whether the production capacity and the production materials of the enterprise can meet the demands of the original MPS. If contingencies arise which require rescheduling of the MPS, at step S318, the MPS generating module 104 amends the original MPS. Such contingencies may include, for example, insufficient production capacity and lack of production materials. At step S320, the MPS generating module 104 generates an optimized MPS after one or more amendments of the original MPS. Afterward, the weekly scheduling module 108 generates weekly production schedules that are provided to production departments for scheduling of production.

Figure 4:
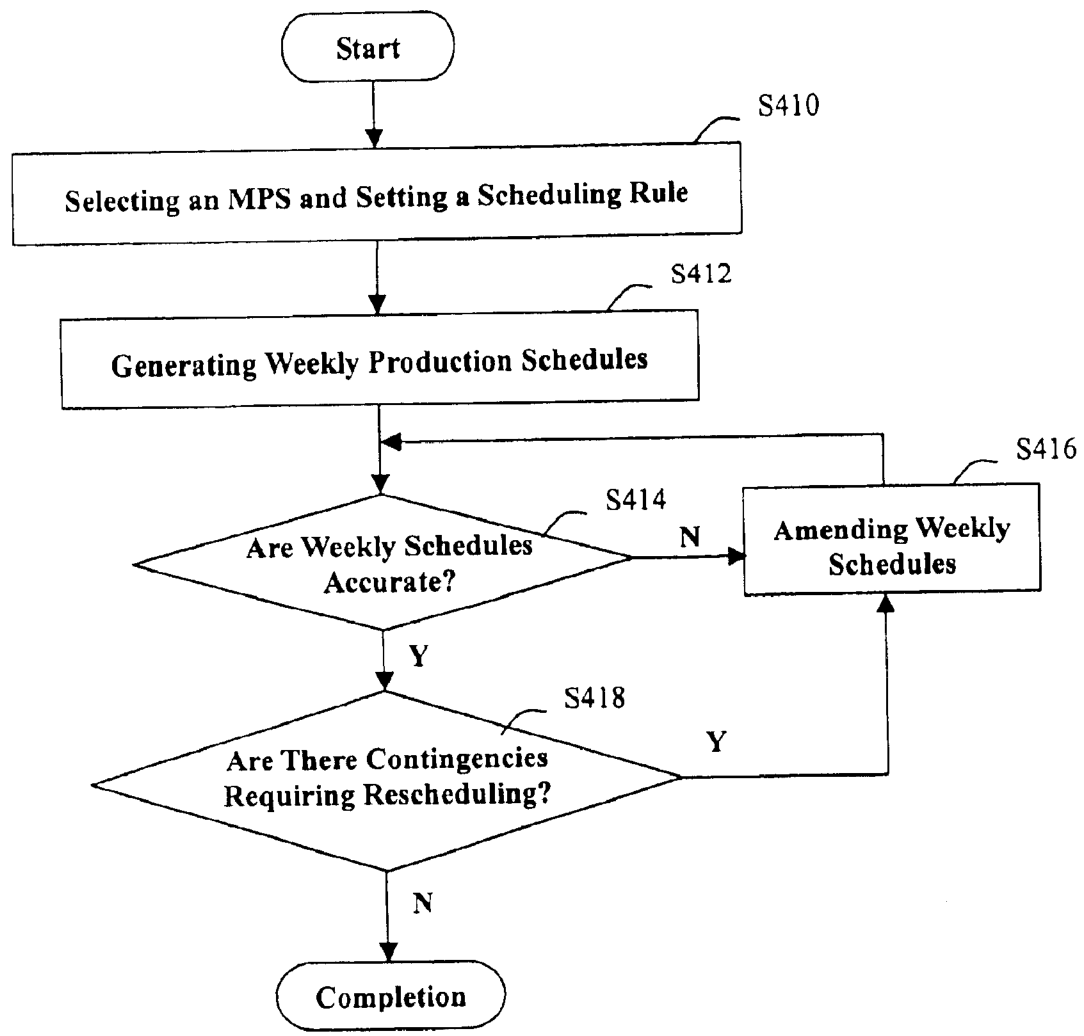
FIG. 4 is a flow chart of generating weekly production schedules in accordance with the present invention.

FIG. 4 is a flow chart of generating weekly production schedules in accordance with the present invention. At step S410, the data maintaining module 102 selects an MPS for generating weekly production schedules, and sets a scheduling rule. The selected MPS may be an original MPS or an optimized MPS. The scheduling rule may be a first maturity rule, a shortest process time rule, an urgency rule, or a first in, first out (FIFO) rule. The first maturity rule means that if the maturity date of an order is earlier than maturity dates of all other orders, the earliest order should be processed first. The shortest process time rule means that if the process time of an order is shorter than that of any other orders, the order having the shortest process time should be processed first. The urgency rule means that if an order is more urgent than all other orders, the most urgent order should be processed first. The FIFO rule means that if an order is submitted earlier than all other orders, the order submitted earliest should be processed first. At step S412, the weekly scheduling module 108 generates weekly production schedules based on purchase orders, inventory data, orders, and the selected MPS. The weekly production schedules comprise a finished quantity of each product on each day, and a starting time, a completion time and a maturity date of each order. At step S414, a user determines whether the weekly production schedules are complete and accurate. If any weekly production schedules are not complete and accurate, at step S416, the weekly scheduling module 108 amends such weekly production schedules, whereupon the procedure returns to step S414. If and when all the weekly production schedules are complete and accurate, at step S418, the user determines whether there are any contingencies that would require rescheduling of any of the weekly production schedules. The contingencies may include, for example, changes to orders, failure of production apparatus, changes to MOs, and production of faulty products. If any of said contingencies exist, at step S416, the weekly scheduling module 108 amends the relevant weekly production schedules, whereupon the procedure returns to step S414.

Figure 5:
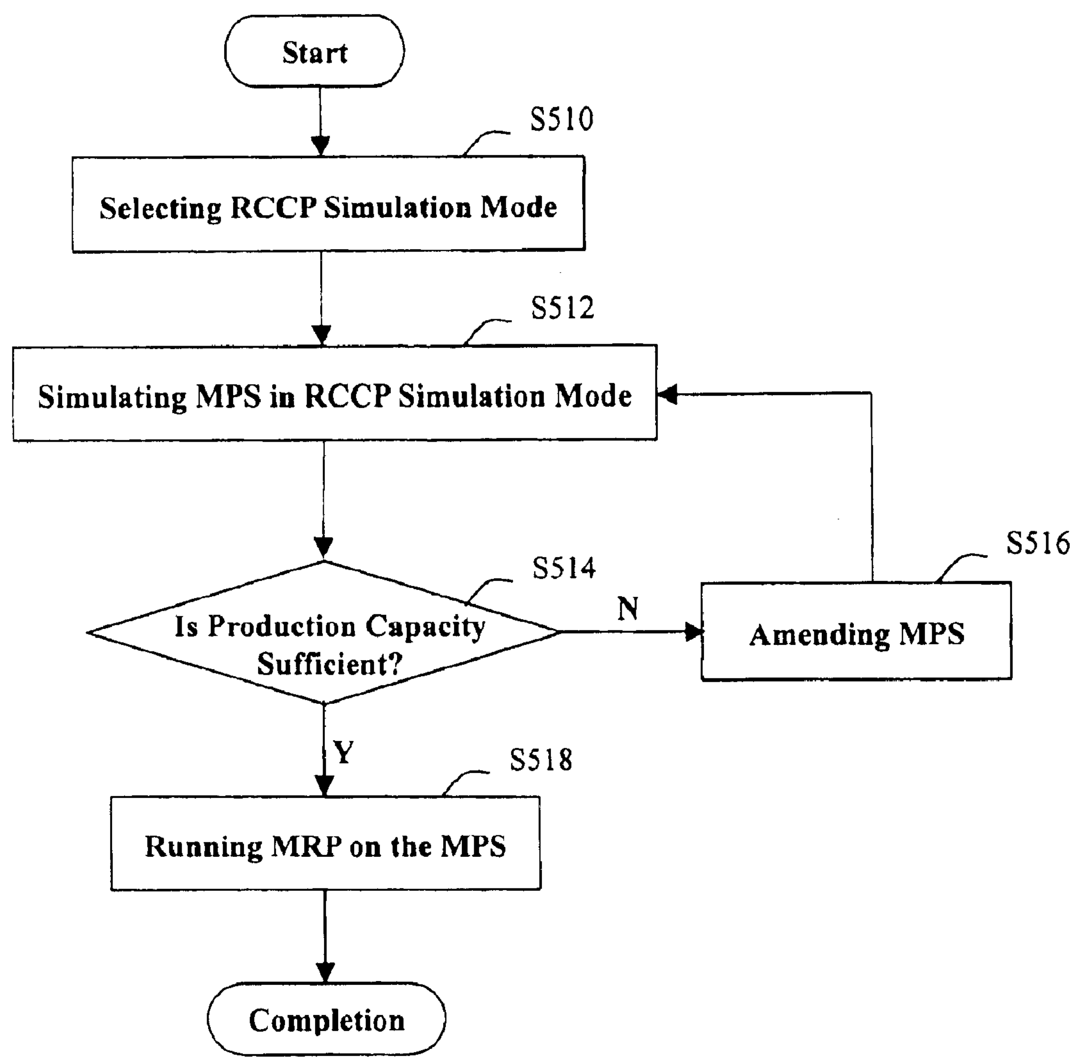
FIG. 5 is a flow chart of simulating RCCP in accordance with the present invention.

FIG. 5 is a flow chart of simulating RCCP in accordance with the present invention. In this flow chart, for the purposes of best illustrating the present invention, the simulation of the RCCP is based on an original MPS. Simulation of RCCP can enable users to evaluate how an MPS influences a production bottleneck. The production bottleneck may be a production department, or a production apparatus. At step S510, the simulation mode selecting sub-module selects the RCCP simulation mode for performing simulation. At step S512, the RCCP simulating sub-module of the simulating module 106 simulates the original MPS in the RCCP simulation mode and according to a default scheduling rule. The default scheduling rule may be any one of the first maturity rule, the shortest process time rule, the urgency rule, and the FIFO rule. Based on simulation results generated by the RCCP simulating sub-module, the simulation report generating sub-module generates a production capacity report that lists workstations that have insufficient production capabilities. At step S514, the simulating module 106 determines whether each workstation has a sufficient production capacity, especially those workstations that were indicated in the report to be production bottlenecks. If all workstations have sufficient production capacity, at step S518, the original MPS is set as an optimized MPS, and MRP is run on the optimized MPS. If there are any workstations that do not have sufficient production capacity, at step S516, the MPS generating module 104 amends the original MPS to enable one of those workstations to have sufficient production capacity to meet the demands of the amended MPS, whereupon the procedure returns to step S512 in relation to the amended MPS. This loop continues running until the amended MPS has been amended such that all workstations have sufficient production capacities to meet the demands of the amended MPS.

Figure 6:
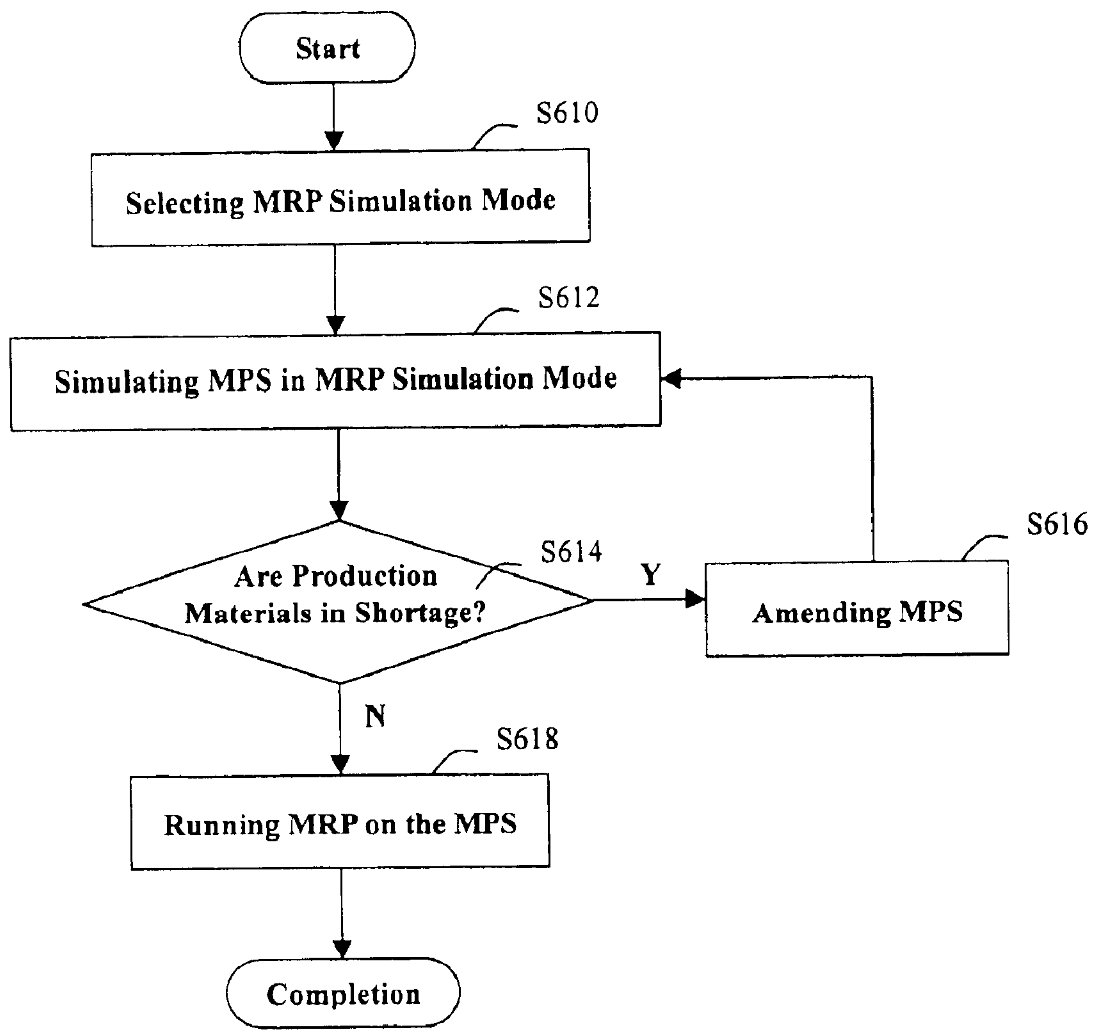
FIG. 6 is a flow chart of simulating MRP in accordance with the present invention.

FIG. 6 is a flow chart of simulating MRP in accordance with the present invention. Simulation of MRP enables users to effectively control the supply of all production materials. In this flow chart, for the purposes of best illustrating the present invention, the simulation of the MRP is based on an original MPS. At step S610, the simulation mode selecting sub-module selects the MRP simulation mode for performing simulation. At step S612, the MRP simulating sub-module of the simulating module 106 simulates the original MPS in the MRP simulation mode and according to a default scheduling rule. The default scheduling rule may be any one of the first maturity rule, the shortest process time rule, the urgency rule, and the FIFO rule. Based on simulation results generated by the MRP simulating sub-module, the simulation report generating sub-module generates a production material report that lists production materials that are in shortage. At step S614, the simulating module 106 determines whether there are any production materials in shortage in the production material report. If there are no production materials in shortage, at step S618, the original MPS is set as an optimized MPS, and MRP is run on the optimized MPS. If there are any production materials in shortage, at step S616, the MPS generating module 104 amends the simulated MPS to enable one of the production materials in shortage to meet the demands of the amended MPS, whereupon the procedure returns to step S612 in relation to the amended MPS. This loop continues running until the amended MPS has been amended such that all production materials in shortage are able to meet the demands of the amended MPS.

Although only preferred embodiments of the present invention have been described in detail above, those skilled in the art will readily appreciate that many modifications to the preferred embodiments are possible without materially departing from the novel teachings and advantages of the present invention. Accordingly, all such modifications are deemed to be covered by the following claims and allowable equivalents of the claims.

What is claimed is:

1. A master production scheduling management system for generating master production schedules (MPSs), comprising:

at least one client computer;

a database server;

an MPS management server, comprising:

a data retrieving module for obtaining data from one or more external information systems;

an MPS generating module for generating an original MPS, and for amending the original MPS to be an optimized MPS by simulating rough-cut capacity planning (RCCP) and material requirements planning (MRP);

a simulating module for simulating RCCP and MRP based on the original MPS; and a weekly scheduling module for generating weekly production schedules based on the optimized MPS; and a network interconnecting the at least one client computer, the database server and the MPS management server.

2. The master production scheduling management system as claimed in claim 1, wherein the external information systems comprise a purchase order information system, an inventory information system, and a manufacturing order information system.

3. The master production scheduling management system as claimed in claim 1, wherein the simulating module comprises:

a simulation mode selecting sub-module for selecting one of simulation modes for performing simulation, the simulation modes comprising an RCCP simulation mode and an MRP simulation mode;

an RCCP simulating sub-module for simulating the original MPS in the RCCP simulation mode;

an MRP simulating sub-module for simulating the original MPS in the MRP simulation mode; and a simulation report generating sub-module for generating one or more simulation reports based on simulation results generated by the RCCP simulating sub-module and the MRP simulating sub-module.

4. The master production scheduling management system as claimed in claim 1, wherein the MPS management server further comprises a data maintaining module for performing maintenance of basic data, the basic data comprising sales forecast data, an enterprise's calendar, and parameters of material codes in an MPS.

* * * * *